(12) United States Patent
Lee

(10) Patent No.: US 11,278,147 B2
(45) Date of Patent: Mar. 22, 2022

(54) PROCESS FOR MANUFACTURE OF PROFILED NON-STICK PANS WITH CONCAVE-CONVEX PATTERN

(71) Applicant: JIANGMEN YISHAN METAL PRODUCTS CO., LTD., Guangdong (CN)

(72) Inventor: Changho Lee, Guangdong (CN)

(73) Assignee: JIANGMEN YISHAN METAL PRODUCTS CO., LTD., Jiangmen (CN)

( * ) Notice: Subject to any disclaimer, the term of this patent is extended or adjusted under 35 U.S.C. 154(b) by 23 days.

(21) Appl. No.: 16/963,786

(22) PCT Filed: Oct. 24, 2018

(86) PCT No.: PCT/CN2018/111571
§ 371 (c)(1),
(2) Date: Jul. 21, 2020

(87) PCT Pub. No.: WO2020/077655
PCT Pub. Date: Apr. 23, 2020

(65) Prior Publication Data
US 2020/0345168 A1 Nov. 5, 2020

(30) Foreign Application Priority Data
Oct. 19, 2018 (CN) .......................... 201811219253.2

(51) Int. Cl.
*A47J 27/00* (2006.01)
*A47J 36/02* (2006.01)
(Continued)

(52) U.S. Cl.
CPC ........... *A47J 27/002* (2013.01); *A47J 36/025* (2013.01); *B05D 3/0254* (2013.01); *B05D 7/24* (2013.01);
(Continued)

(58) Field of Classification Search
None
See application file for complete search history.

(56) References Cited

U.S. PATENT DOCUMENTS

2008/0083747 A1 * 4/2008 Park .................... A47J 27/022
219/621

FOREIGN PATENT DOCUMENTS

| CN | 2010052068 Y | 4/2008 |
| CN | 101377617 A | 3/2009 |

(Continued)

OTHER PUBLICATIONS

Written Opinion for International (PCT) Application No. PCT/CN2018/111571, dated Apr. 23, 2020.
(Continued)

*Primary Examiner* — Alexander M Weddle
(74) *Attorney, Agent, or Firm* — Weitzman Law Offices, LLC

(57) ABSTRACT

A process for manufacture of a profiled non-stick pan with a concave-convex pattern, which includes the following steps: preparing a flat blank for forming a pan body; screen printing a layer of ink with a predetermined pattern on a surface of the blank for a pan body, then drying and curing the ink; etching, by an etching process, the surface of the blank, on areas of the surface not covered by the ink, then cleaning and drying the blank, and retaining the ink; spraying non-stick pan coating on the blank, then baking the blank at high temperature, to enable the ink to automatically peel off at high temperature; pressing and stretching the blank to form a profiled pan body, then deburring and polishing on an edge of the pan body.

8 Claims, 3 Drawing Sheets

(51) Int. Cl.
    *B05D 3/02*     (2006.01)
    *B05D 7/24*     (2006.01)
(52) U.S. Cl.
    CPC ...... *B05D 2202/15* (2013.01); *B23P 2700/05* (2013.01)

(56) References Cited

FOREIGN PATENT DOCUMENTS

| | | |
|---|---|---|
| CN | 103142132 A | 6/2013 |
| CN | 103844877 A | 6/2014 |
| CN | 106958020 A | 7/2017 |
| CN | 108065749 A | 5/2018 |
| DE | 202012105036 U1 | 3/2013 |
| KR | 100703881 B1 | 4/2007 |
| KR | 100804387 B1 | 2/2008 |
| KR | 101392095 B1 | 5/2014 |
| KR | 101894663 B1 * | 9/2018 |
| KR | 101894663 B1 | 9/2018 |

OTHER PUBLICATIONS

Notice of First Office Action for CN 201811219253.2, dated Apr. 14, 2020.

* cited by examiner

PROCESS FOR MANUFACTURE OF PROFILED NON-STICK PANS WITH CONCAVE-CONVEX PATTERN

CROSS-REFERENCE TO RELATED APPLICATIONS

The present application is a national phase entry under 35 USC § 371 of International Application PCT/CN2018/111571, filed Oct. 24, 2018, which claims the benefit of and priority to Chinese Patent Application No. 201811219253.2, filed Oct. 19, 2018, the entire disclosures of which are incorporated herein by reference.

TECHNICAL FIELD

The present disclosure relates to a manufacture process of kitchen cookware, and in particular, to a manufacture process of non-stick pans with concave-convex pattern.

BACKGROUND

At present, people usually use metal pans to fry food, but when using traditional frying pans to fry food, sticking or burning often occurs, which not only destroys the appearance of the food, but also produces harmful substances that affect people's health, in addition, it also increases the difficulty of brushing cookware. Accordingly, at present, a layer of non-stick pan material called "Teflon" usually be coated on an inner surface of a frying pan to achieve a non-stick function, however, when cooking with or cleaning the frying pan, the coating may fall off due to friction with a spatula or cleaning utensils, thus the non-stick effect may be disabled, and the spalling coating mixed into food will also endanger people's health.

Accordingly, at present, a new type of non-stick pan is available. A plurality of independent oil grooves are uniformly distributed on the inner surface of the pan body, and the surface of the oil groove is attached with a non-stick pan coating. This design enables the oil stored in these oil grooves to be heated and boiled, and the food floats slightly after being supported by these scattered and boiling oil. As the food will not directly touch the bottom of the pan, sticking on the pan can be effectively prevented At present, the non-stick pan with concave-convex pattern usually has a round shape, and the manufacturing process is: getting the pattern by printing or etching; forming the shape of the pan by stretching; spraying non-stick pan coating; polishing the non-stick pan coating on a convex surface to obtain a finished product. However, at present, when some customers require the non-stick pan to be made into a polygonal or oval shape, according to the aforesaid process, as the product is stretched after etching the pattern, the corners of polygonal or oval pans cannot be polished smoothly in the follow-up polishing process, which leads to low production efficiency, and the quality cannot meet the requirements of people.

SUMMARY

In order to overcome the deficiency of the above-mentioned manufacturing method, the present disclosure provides a process for manufacture of profiled non-stick pan with concave-convex pattern, which is simple and has lower cost.

A technical scheme corresponding to above-mentioned technical problems is provided according to the present disclosure: a process for manufacture of a profiled non-stick pan with a concave-convex pattern, which includes the following steps:

Step S1: preparing a flat blank for forming a pan body;

Step S2: screen printing a layer of ink with a predetermined pattern on a surface of the blank for a pan body, then drying and curing the ink;

Step S3: etching, by an etching process, the surface of the blank for a pan body, on areas of the surface not covered by the ink, then cleaning, drying the blank for a pan body, and retaining the ink;

Step S4: spraying non-stick pan coating on the blank for a pan body, then baking the blank for a pan body at high temperature, to enable the ink to automatically peel off at high temperature;

Step S5: pressing and stretching the blank for a pan body to form a profiled pan body, then deburring and polishing an edge of the pan body.

The present disclosure has the following prominent technical effects:

According to an embodiment of the present disclosure, after screen printing and etching are carried out on the flat blank, the ink is not washed off, but the blank is washed and dried with clean water; in the following spraying process, high temperature baking is adopted, as the sintering temperature of the ink is lower than that of the coating, the ink will automatically sinter and peel off during baking, and then the pattern will appear automatically. It is no longer necessary to polish the non-stick pan coating as before in order to make the part with patterns appear, this method is not only efficient, but also effectively ensures the quality of the finished product.

BRIEF DESCRIPTION OF THE DRAWINGS

The present disclosure is further illustrated in combination with the drawings and embodiments below, wherein.

DETAILED DESCRIPTION

The technical schemes of the present disclosure will be further described as below with reference to the embodiments.

According to an embodiment of the present disclosure, there's provided a process for manufacture of a profiled non-stick pan with a concave-convex pattern, which includes the following steps:

Step S1: preparing a flat blank for forming a pan body;

In the step S1, a flat blank of 3 layers of steel composite may be selected, in which an outer layer and an inner layer are stainless steel, while the middle layer is aluminum alloy. Because the middle layer of aluminum alloy conducts heat quickly and evenly, thus heat can be uniformly transferred to the inner layer of stainless steel. Therefore, the food can be uniformly heated when being cooked, which results in a smokeless effect.

Step S2: screen printing a layer of ink with a predetermined pattern on a top surface of the blank for a pan body, then drying and curing the ink;

The predetermined pattern may be a matrix of uniformly distributed polygons, such as squares, honeycomb-like hexagons.

Step S3: etching, by an etching process, the surface of the blank for a pan body, on areas of the surface not covered by the ink, then cleaning, drying the blank for a pan body, and retaining the ink;

Step S4: spraying non-stick pan coating on the blank for a pan body, then baking the blank for a pan body at high temperature, to enable the ink to automatically peel off at high temperature; non-stick pan coatings available for the non-stick pan may generally categorized into two types: Teflon (i.e., PTFE), or ceramic coating (i.e., ceramic).

In step S4, baking at a temperature ranging from 400° C. to 500° C.

Step S5: pressing and stretching the blank for a pan body to form a profiled pan body, then deburring and polishing on an edge of the pan body.

The profiled shape is polygonal or oval. Such as square, hexagon, etc.

Figure 1:
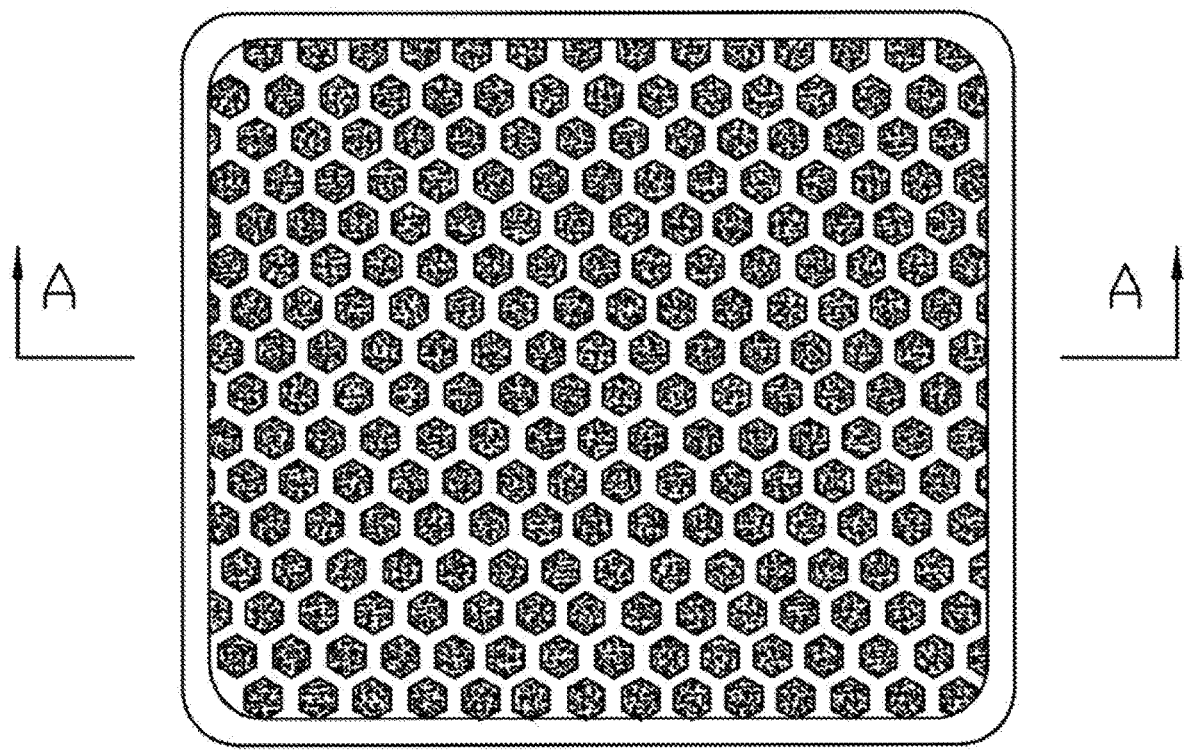
FIG. 1 is a structure diagram of an embodiment of the disclosure.
Figure 2:
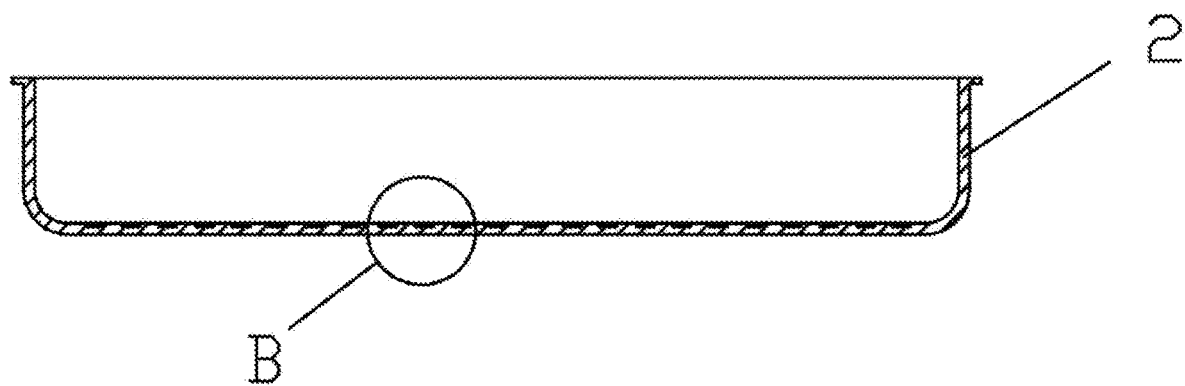
FIG. 2 is a cross-sectional view taken along the line A-A in FIG. 1.
Figure 3:
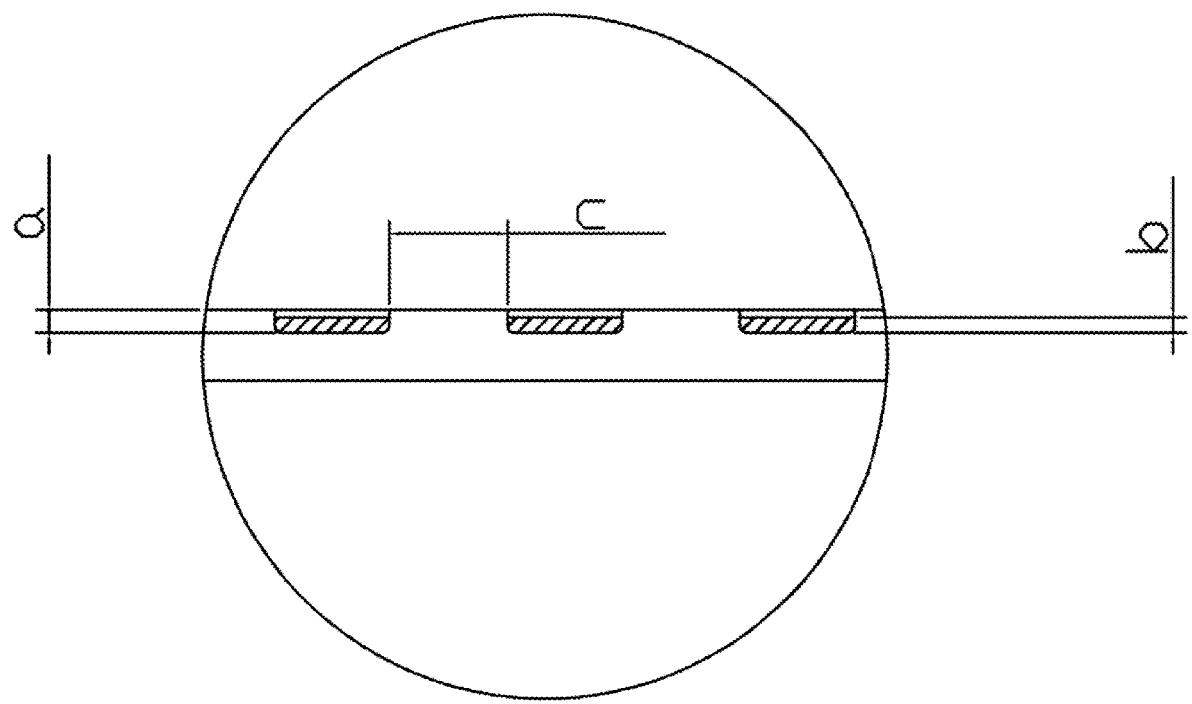
FIG. 3 is an enlarged view for an area indicated by B in FIG. 2.

According to some embodiments of the present disclosure, in order to make a profiled non-stick pan with concave-convex patterns on both the inside and exterior, step S2 further includes the following step: S201: printing a layer of ink with a predetermined pattern on a bottom surface of the blank for a pan body, and drying and curing the ink;

According to some embodiments of the present disclosure, with reference to FIGS. 1-3, the etching depth $\alpha$ in step S3 is 0.1~0.3 mm.

According to some embodiments of the present disclosure, the non-stick pan coating thickness sprayed in step S4 is below 0.1 mm.

According to some embodiments of the present disclosure, the gap of the convex pattern in step S4 is within 1 mm.

According to some embodiments of the present disclosure, there may be several independent or non-independent oil grooves distributed on the inner surface of the pan. When the oil in the pan is heated, the oil stored in these oil grooves are heated and boil, and the food floats slightly after being supported by these scattered and boiling oil. As the food will not directly touch the bottom of the pan, sticking on the pan can be effectively prevented.

According to the embodiments of the present disclosure, after printing and etching are carried out on the flat blank, the ink is not washed off, but the blank is washed and dried with clean water, and in the follow-up spraying process, high temperature baking is adopted, and as the sintering temperature of the ink is lower than that of the coating, in the baking process, the ink will automatically sinter and fall off, and the pattern will appear automatically. It is no longer necessary to polish the non-stick pan coating as before in order to make the part with patterns appear, this method is not only efficient, but also effectively ensures the quality of the finished product.

A person of ordinary skill in the art can realize or utilize the present disclosure according to the above description of the disclosed embodiments. A variety of modifications to these embodiments will be obvious to those skilled in the art, and the general principles defined herein can be implemented in other embodiments without departing from the principle or scope of the present disclosure. Therefore, the present disclosure will not be limited to these embodiments shown herein, but will conform to the widest range consistent with the principles and novel features of the disclosure.

The invention claimed is:

1. A process for manufacturing a profiled non-stick pan with a concave-convex pattern, comprising:
   Step S1: providing a flat blank for forming a pan body;
   Step S2: screen printing a layer of ink with a predetermined pattern on a surface of the flat blank for forming a pan body, then drying and curing the ink;
   Step S3: etching, by an etching process, the surface of the flat blank for forming a pan body, on areas of the surface not covered by the ink, then cleaning and drying the flat blank for forming a pan body, and retaining the ink;
   Step S4: spraying non-stick pan coating on the flat blank for forming a pan body, then baking the flat blank for forming a pan body at a temperature higher than a sintering temperature of the ink, to cause the ink to automatically sinter and peel off at the temperature; and
   Step S5: pressing and stretching the flat blank for forming a pan body to form a profiled pan body, then deburring and polishing on an edge of the pan body.

2. The process according to claim 1, wherein a flat blank of three layers of steel composite is used in step S1.

3. The process according to claim 1, wherein step S2 further comprises:
   printing a layer of ink with a predetermined pattern on an inside bottom surface of the flat blank of for forming a pan body, and drying and curing the ink.

4. The process according to claim 1, wherein the predetermined pattern is a matrix of uniformly distributed polygons.

5. The process according to claim 1, wherein the profiled pan body in step S5 has a shape that is polygonal or oval.

6. The process according to claim 1, wherein an etching depth in step S3 is 0.1~0.3 mm.

7. The process according to claim 1, wherein the non-stick pan coating sprayed in step S4 has a thickness below 0.1 mm.

8. The process according to claim 1, wherein the baking is at a temperature above 400° C. in step S4.

* * * * *